United States Patent [19]
Olson

[11] Patent Number: 5,753,792
[45] Date of Patent: May 19, 1998

[54] STATIC AND DYNAMIC MOTION WEIGHT MEASURING APPARATUS

[76] Inventor: Robert Olson, 18227 SE. 135th, Renton, Wash. 98059

[21] Appl. No.: 714,549

[22] Filed: Sep. 16, 1996

[51] Int. Cl.$^6$ .................................................. G01G 23/00
[52] U.S. Cl. ........................................ 73/1.13; 177/25.18
[58] Field of Search ........................ 73/1 B, 862.381, 73/1.13; 177/25.18

[56] References Cited

U.S. PATENT DOCUMENTS

| | | | |
|---|---|---|---|
| 3,446,299 | 5/1969 | Leonowicz | 177/25 |
| 3,857,488 | 12/1974 | Le Cren | 209/73 |
| 4,156,361 | 5/1979 | Melcher et al. | 73/1 B |
| 4,387,778 | 6/1983 | Wohrl | 73/1 B |
| 4,413,739 | 11/1983 | Kohashi | 177/25 |
| 4,553,619 | 11/1985 | Fujinaga | 177/185 |
| 4,696,360 | 9/1987 | Homen | 177/262 |
| 4,697,657 | 10/1987 | Portman et al. | 177/210 |
| 4,709,770 | 12/1987 | Kohashi et al. | 177/25 |
| 4,768,600 | 9/1988 | Colvin et al. | 177/1 |
| 4,823,894 | 4/1989 | Koerner | 177/25.14 |
| 5,109,936 | 5/1992 | Ruppel | 177/25.19 |
| 5,547,327 | 8/1996 | Bachalo | 414/137.1 |

*Primary Examiner*—George M. Dombroske
*Assistant Examiner*—Max H. Noori

[57] ABSTRACT

Apparatus and processes for measuring a correct weight of one or more objects subjected to predictable and/or unpredictable static and/or dynamic motion conditions.

20 Claims, 17 Drawing Sheets

STATIC AND DYNAMIC MOTION WEIGHT MEASURING APPARATUS

COPYRIGHT NOTICE

©Copyright 1996 James R. Vance. ©Copyright 1996 Washington Belt & Drive Systems, Inc. All Rights Reserved.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and processes for measuring weight of one or more objects subjected to predictable and/or unpredictable static and/or dynamic conditions.

BACKGROUND ART

Commercial fishing operators typically unload their cargo of fish, shrimp, crab and/or other captured aquatic creatures to: (a) a dockside processing plant, (b) a large floating processing ship, and/or (c) a collector ship that collects loads from several individual boats within a fishing fleet and then transports the combined cargo to a remotely located processing plant.

Unfortunately, for many types of seafood, the largest harvests occur during periods of extreme inclement weather. Wave crests of approximately three feet (3') to ten feet (10') are not unusual. Fishing operators are often compelled by economic demands to continue working when wave crests even exceed ten feet (10').

There is also a nearly universal social belief among fishing operators that operators of processing plants, processing ships, and collector ships underestimate and undervalue the weight of the operator's delivered cargos. This belief has caused violence and even gunfire to occur when a disgruntled fishing operator disputes the weight amount and/or quality of the unloaded cargo. The volatility of the situation is further enhanced by the adverse sea conditions which quickly and easily drain a person's strength and reason.

It is generally agreed that the measured weight would be relatively correct if the measurement was taken on properly calibrated equipment when the cargo and unloading dock were in a static condition, i.e., not moving. This usually occurs when the cargo is unloaded at a dockside, land-based processing plant.

However, if the cargo is weighed while being subjected to predictable and/or unpredictable dynamic motion, the weight amount or value could easily be disputed. For example, if the weight measurement is taken as the cargo reaches a crest in a wave and/or is dropping down into a trough of a wave, the measured amount or value could be significantly lower than the correct weight amount. Conversely, if the weight measurement is taken as the cargo reaches a bottom of a trough of a wave and/or is being pushed upwardly toward a wave crest, the measured amount or value could be significantly higher than the correct weight amount.

Consequently, conventional methods of measuring the weight of such objects when supported within equipment secured to a dynamically moving boat deck are extremely inaccurate.

In an effort to regulate the fishing industry and eliminate emotional volatility on the high seas, the State of Alaska mandated that only a two pound (2 lb) error or variance can occur when weighing a load of up to five thousand pounds (weight value <5,000 lbs). A tolerance error or variance of only three pounds (3 lbs) can occur when weighing a load of over five thousand pounds (weight value >5,000 lbs). Although these requirements give legitimacy to the complaints of fishing operators, to the knowledge of the inventor, heretofore, no device has ever been created that can achieve these required levels of tolerance on the high seas under conditions of such unpredictable, dynamic wave motion. Consequently, the aforementioned problems are not reduced or solved simply by the enactment of legislation.

Although the foregoing description of the fishing industry identifies the primary application for the present invention, the present invention could also be used in other situations wherein the weighing apparatus and/or weighed load experience dynamic wave motion. For example, many conveyor belt systems have weighing apparatus built therein to measure the weight of the carried and/or transported load. Such weight measurements could be disputed if the conveyor belt system experiences adverse vibrations, the carried loads experience excessive bouncing, and/or the underlying support structure for the conveyor belt system is subject to predictable and/or erratic movement. In the latter instance, the conveyor belt system may be secured to an underlying deck or hull of a ship experiencing high sea conditions as described above.

The following patents were discovered when a novelty search was conducted for the subject matter of the present invention: Fujinaga (U.S. Pat. No. 4,553,619, issued Nov. 19, 1985); Homen (U.S. Pat. No. 4,696,360, issued Sep. 29, 1987); Portman, Jr. et al. (U.S. Pat. No. 4,697,657, issued Oct. 6, 1987); Colvin et al. (U.S. Pat. No. 4,768,600, issued Sep. 6, 1988); Koerner (U.S. Pat. No. 4,823,894; issued Apr. 25, 1989); Leonowicz (U.S. Pat. No. 3,446,299); and Le Cren (U.S. Pat. No. 3,857,488, issued Dec. 31, 1974).

Fujinaga ('619) discloses an electronic balance which displays a weight value by averaging digitized weight data. Weight data averaging is intended to give a correct weight value. Averaging is carried out with the number of the basis data being increased each time a new weight data is obtained. The weight data are considered to be stabilized by being settled down in a predetermined limit. The digitized weight data is then outputted at predetermined time intervals from the weight detector. The once stabilized weight data might be brought back into a fluctuating state due to an external disturbance. Such fluctuation is detected and the again unstabilized weight data are excluded from the averaging to give a corrected weight value.

Homen ('360) discloses a weighing apparatus and method for use in weighing a live fish. The weighing apparatus and method have: (a) a container member with a base member; (b) a swingably coupled cover member above the container member; and (c) a guide member coupled below the base member. The guide member allows the container to be slidably mounted above a weighing scale.

Portman, Jr. et al. ('657) disclose a piezoelectric weighing device to determine the absolute weight of an unknown sample by comparison to a control sample whose weight is known. More particularly, a piezoelectric driver is resiliently attached to a base that is isolated from vibrations. A piezoelectric receiver and a reed are resiliently attached to the piezoelectric driver so that the reed is moved in response to motion of the piezoelectric driver, and the piezoelectric receiver gives an electric signal out proportional to motion of the system. The entire system is set to operate on the leading edge of the resonate frequency for the system. By applying an oscillating sine wave voltage, such as 140 hertz, to the piezoelectric driver, and by applying a known mass to the tip of the reed, a first output is obtained from the piezoelectric receiver which represents the calibrated weight. Next by exchanging an unknown sample for the known mass, a second output is obtained that represents the second weight. By a ratio of the second output/first output (or a signal equivalent to the weights being measured), the weight of the unknown sample is determined.

Colvin et al. ('600) discloses a high speed weighing system for weighing articles moving along a conveyor or the like. The article to be weighed is dropped onto a weighing platform so that the article skips across a platform. The article is weighed during a predetermined time period as the article traverses the weighing platform. The weighing platform is secured to a structural transducer having electrical strain gauges in connection with fast-summing amplification and integration circuitry. The high speed weighing system measures both the potential and kinetic energy of an article skipping and sliding across the impact plate of the weighing system as the article to be weighed drops from the upstream conveyor and traverses the impact plate onto the downstream conveyor. After the integration circuit has integrated the signal from the fast-summing amplifier, it is compared to a target value or range of values by a comparator circuit. The timing circuit then sends a pulse to the comparator circuit which generates a signal to indicate whether the article weighed is within acceptable bounds. This signal can be used to control other equipment or to merely accept or reject the article weighed.

Koerner ('894) discloses a method of weighing equines in which the handler places both equine forefeet, or one forefoot with the handler supporting the other, onto a permanently installed or portable scale which is designed and calibrated to measure the weight bearing on it and indicate to the handler a total equine weight which the scale derives through division of the measured weight by predetermined percentage of the total family equine weight carried on the forefeet. The percentage factor can be set into the scale as a fixed factor or as an adjustable factor.

Neither Leonowicz ('299) nor Le Cren ('488) appear to be any more relevant to the present invention than the patents discussed above.

The inventor believes that the above-listed information, patents, apparatus and devices, whether taken alone or in combination, neither anticipate nor render obvious the present invention. The foregoing explanations do not constitute an admission that such information, patents, apparatus or devices are pertinent, relevant or material to the present claims. Rather, such information, patents, apparatus and devices relate only to the general field of the current disclosure and constitute the closest art of which the inventor is aware.

DISCLOSURE OF INVENTION

The present invention provides an uncomplicated but very effective process or procedure to create and assemble a relatively small number of off-the-shelf and easily constructed component parts to create a weight measuring apparatus having significant superior accuracy.

The present invention can be used to manufacture a wide variety of different weight measuring apparatus and devices that can accurately compensate or correct for inaccuracies attendant to predictable and/or unpredictable static and/or dynamic conditions.

The present invention can be used to retrofit existing fish bins, totes and conveyor systems that are currently available on the market. If existing fish bins, totes and conveyor systems are modified as taught herein, the present invention eliminates the need for the patentee to purchase, install, house, operate, maintain, and insure an arsenal of complex manufacturing machinery that would otherwise be required to manufacture apparatus that incorporate the concepts of this invention. Thus, it can be dramatically less expensive and more economical to manufacture and use the extremely accurate apparatus and processes of the present invention than to manufacture and use the significantly inaccurate devices heretofore known in the art.

Alternatively, the patentee may desire to manufacture fish bins, totes, conveyor systems and/or other apparatus that are specifically constructed to incorporate the concepts of this invention therein.

Measuring apparatus using the present invention are more easily constructed and assembled than measuring devices heretofore known. For example, the present invention does not require the use of an inordinate number of component parts that must be machined, molded, separated, cataloged, gathered, fitted, screwed, bolted, lacquered and finished in a mind-numbing particular order according to a strict and stringent complex array of instructions in order to construct the apparatus.

Once the principles of operation of the present invention are understood, the disclosed apparatus is extremely simple to assemble and use. Only a minimum amount of manipulation, physical dexterity, skill, knowledge and effort are required to construct, assemble and use the apparatus of the invention. The invention does not require the use of a large number of complex tools to either construct or assemble the apparatus.

Furthermore, the present invention does not require the use of several attachments in order to provide structural integrity to the apparatus. Instead, the apparatus of this invention can be constructed to have internal structural integrity.

Since the apparatus of this invention occupies only a very small amount of space, the invention may be effectively and efficiently transported and stored when only a minimum amount of space is available. For example, the apparatus may assume a very small or minimal amount of traveling and storage space when used within environments where storage space and/or weight are significantly restricted, such as occurs when the apparatus is used and/or transported within a small boat, vessel, ambulance, aircraft and/or helicopter.

Although not preferable, the apparatus of the present invention can be easily transferred between different support structures with a minimum amount of delay and trouble. Furthermore, the effectiveness and accuracy of this invention are not adversely affected by a difference between the size, weight and capacity of successively used support structures to which the invention may be attached or secured.

The present invention is simple, compact, efficient, reliable, reusable, durable and rugged. The invention is easily constructed and is inexpensive and economical to manufacture. The present invention is easily used and requires minimal manipulation during use. The invention is easily inspected and serviced.

The present invention not only increases the speed and simplifies the procedure to obtain correct and accurate cargo and load weights, it also provides means so that all persons involved in the process of unloading and/or loading can concentrate upon the tasks at hand without having to constantly worry about the movement of the support structure when the measurement is taken.

It is anticipated that use of the present invention will significantly decrease the number of weight measurement disputes that otherwise would occur within the fishing industry and elsewhere, as compared to use of devices heretofore known.

Furthermore, it is the intention of the inventor that a significant increase in confidence will be experienced within the pertinent industries, in that operators using this invention practice a high standard of honesty and integrity. Thus, the suspicions that have adversely impacted these industries can be at least partially dispelled.

In addition to the foregoing advantages and other advantages described further below, the present invention also overcomes all of the previously mentioned disadvantages.

To achieve these general and specific objectives, in its simplest form the apparatus of the present invention generally comprises the combination of: (a) a mass or element having a known weight value which is operatively attached to a support structure; (b) first weighing means for obtaining a measured weight value of the mass relative to the support structure; and (c) means for comparing the measured weight value to the known weight value of the mass to obtain a correction factor. The obtained correction factor may be applied to any other weight value that is similarly measured relative to the support structure during the same small measurement period.

The support structure generally comprises a support, frame or assembly. For example, the support structure may comprise an assembly upon which a conveyor belt is operated, a framework which generally defines an exoskeletal for a fish bin or tote, a crane boom, or nearly any other appropriate structure.

Since the present invention is primarily intended to measure weight in a changing or dynamic environment, it is anticipated that the support structure will be operatively connected to, secured to or formed integrally within a boat, ship, vessel, truck, train, vehicle, crane, helicopter, airplane, winch support, conveyor mechanism or any other means of conveyance that may experience vibrations and/or dynamic load forces.

It is important to note that the mass element of known weight should be generally shielded from losing or gaining additional mass. For example, the mass is shielded from having an accumulation of ice form and/or debris be deposited thereon which would adversely affect the accuracy of the apparatus. This feature is important because the mass of known weight is used to calibrate the apparatus and to calculate the correction factor. Consequently, within the preferred embodiment of the invention, the mass of known weight is located and protected within a housing that defines an enclosure.

The mass is operatively connected to, secured to or formed integrally within the support structure. Within the preferred embodiment of the invention, the mass of known weight value generally comprises an element of metal or lead. For example, half of a fishing downrigger weight can be used as the mass of known weight value. The mass of known weight value is operatively secured to a first weighing means, which in turn is secured to the support structure.

The first weighing means is used to obtain a measured weight value of the mass relative to the support structure.

Please note that the first weighing means is not isolated from the affects of the dynamic motion of the support structure. Rather the affects or impact of such dynamic motion upon the mass is intended to be ultimately derived from obtaining the measured weight value of the mass when experiencing such dynamic motion.

More particularly, the first weighing means generally comprises a load cell which is operatively connected between the support structure and the mass. The preferred ten pound (10 lb.) UHMW load cell is sold under the trademark CARDINAL as part number SP10L. Of course, other load cells could alternatively be used within this invention. However, with regard to the preferred load cells, each load cell has a capacity from between 2,500 to 20,000 pounds. The load cells are manufactured from stainless steel materials for corrosion resistance. The load cells have a very low profile. Mounting holes and appropriate strain gauges are already provided within each load cell. The property values of these load cells are very well documented and predictable within the ranges of the intended use.

The apparatus is also provided with means for comparing the measured weight value of the mass to the known weight value of the mass to obtain a correction factor or ratio. The correction factor or ratio is attributable to the dynamic motion of the mass relative to the support structure.

The means for comparing the measured weight value of the mass to the known weight value of the mass generally comprises use of an EPROM and appropriately associated electronic equipment or computer which has a computer program burned therein. The EPROM and computer program will be discussed in further detail below.

Once obtained, the correction factor may be applied to any other weight value that is similarly measured relative to the support structure during the same small measurement time period.

Within the preferred embodiment of the present invention, an object of unknown weight may be weighed by placing the object or a plurality of objects into a container. The container selectively holds and/or transports the object. Furthermore, the container is operatively connected to, attached to, secured to or formed integrally within the support structure. For example, the container may generally comprise a fish tote or bin. The support structure may generally comprise an exoskeletal frame for the tote or bin. Alternatively, the container may generally comprise a conveyor belt, a cable, a tether, a rod and/or a brace.

The apparatus is also provided with a second weighing means which may be used to obtain both: (a) a tare or empty weight value of the container relative to the support structure when the object is not held therein or transported thereupon; and (b) a combined weight value of the container and the object that is held therein or transported thereupon relative to the support structure. For example, the second weighing means may generally comprise one or more load cells similar to that discussed above which is operatively connected between the support structure and the container.

In order to obtain a measured weight value of the object or objects, the apparatus is provided with means for subtracting the empty weight value of the container from the combined weight value of the container and the object or objects held within or upon the container. More particularly, within the preferred embodiment of the invention, the means for subtracting the empty weight value of the container from the combined weight value of the container and the object or objects held therein or transported thereupon generally comprises use of the same or a different EPROM and appropriately associated electronic equipment or computer which has a computer program burned therein. The EPROM and computer program will be discussed in further detail below.

Means are also provided to use the correction factor to modify the measured weight value of the object or objects to account for the dynamic motion of the container and the object or objects held therein or transported thereupon relative to the support structure. For example, the means for using the correction factor to modify the measured weight value of the object or objects may also generally comprise use of the same or a different EPROM and appropriately associated electronic equipment or computer which has a computer program burned therein. The EPROM and computer program will be discussed in further detail below.

The present invention further includes a method for measuring a weight of at least one object that is subjected to predictable and/or unpredictable static and/or dynamic motion. More particularly, such method generally comprises the following steps.

Obtain an empty weight value of a container relative to a support structure when the object is not selectively held within the container or transported upon the container. The container should be operatively connected to, attached to, secured to or formed integrally within the support structure.

Place the object within or upon the container.

Obtain a combined weight value of the container and the object relative to the support structure.

Subtract the empty weight value of the container from the combined weight value of the container and the object to obtain a measured weight value of the object.

Obtain a measured weight value of a mass having a known weight value relative to the support structure. The mass element is also operatively connected to, attached to, secured to or formed integrally within the support structure. The mass should generally be shielded from losing or gaining additional mass thereto.

Compare the measured weight value of the mass to the known weight value of the mass to obtain a correction factor. The correction factor is attributable to the dynamic motion of the mass relative to the support structure.

The correction factor can be applied to the measured weight value of the object or objects relative to the support structure to provide a corrected weight value. In other words, the correction factor can be used to modify the measured weight value of the object to account for the dynamic motion of the container and the object or objects held therein or transported thereupon relative to the support structure.

Each of the aforementioned elements will be described in greater detail further below.

The preferred and several different alternative embodiments of the apparatus and associated structures of the present invention and the processes for manufacture and use thereof are further described in greater detail in the following description, claims and drawings of this Specification. However, to avoid any possible confusion as to the scope of the present invention, each of the following sections, claim language and the drawings of this Specification in their entirety are incorporated herein by this reference.

The foregoing and other objectives and advantages of the present invention will become more readily apparent upon reading the following disclosure and referring to the attached drawings.

BRIEF DESCRIPTION OF DRAWINGS

FIG. 1 also illustrates means for transporting or delivering the object, such as fish, to the tote or bin. For example, the transporting or delivering means may comprise a conventional or nonconventional transfer chute or conveyor belt.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the attached drawings, wherein like numerals indicate like parts, the present invention generally comprises apparatus 20 and methods for calculating an extremely accurate weight measurement value of at least one object 22 that is placed within or upon a container 24 or containment device. The invention is particularly well suited for use with a container 24 and/or object 22 that is experiencing, subjected to and/or exposed to predictable and/or unpredictable static and/or dynamic motion conditions.

More particularly, the present invention provides means for selectively and/or continuously calibrating a weight scale or weighing device to correct for inaccuracies caused by variations in static and/or dynamic movement of the container 24 and/or the weighed object 22. Thus calibrated, the accuracy of the weighing apparatus 20 and measurements can be confirmed and certified by a governmental agency.

The container 24 may comprise any structure that at least temporarily holds, contains, transports and/or stores at least one object 22. For example, the container 24 might comprise a tote, box, bin, conveyor belt, cable, or other appropriate structure. As seen within FIG. 1, the container 24 within the preferred embodiment of the invention generally comprises a fishing tote or bin such as that sold under the trademark TRIDENT.

Figure 5:
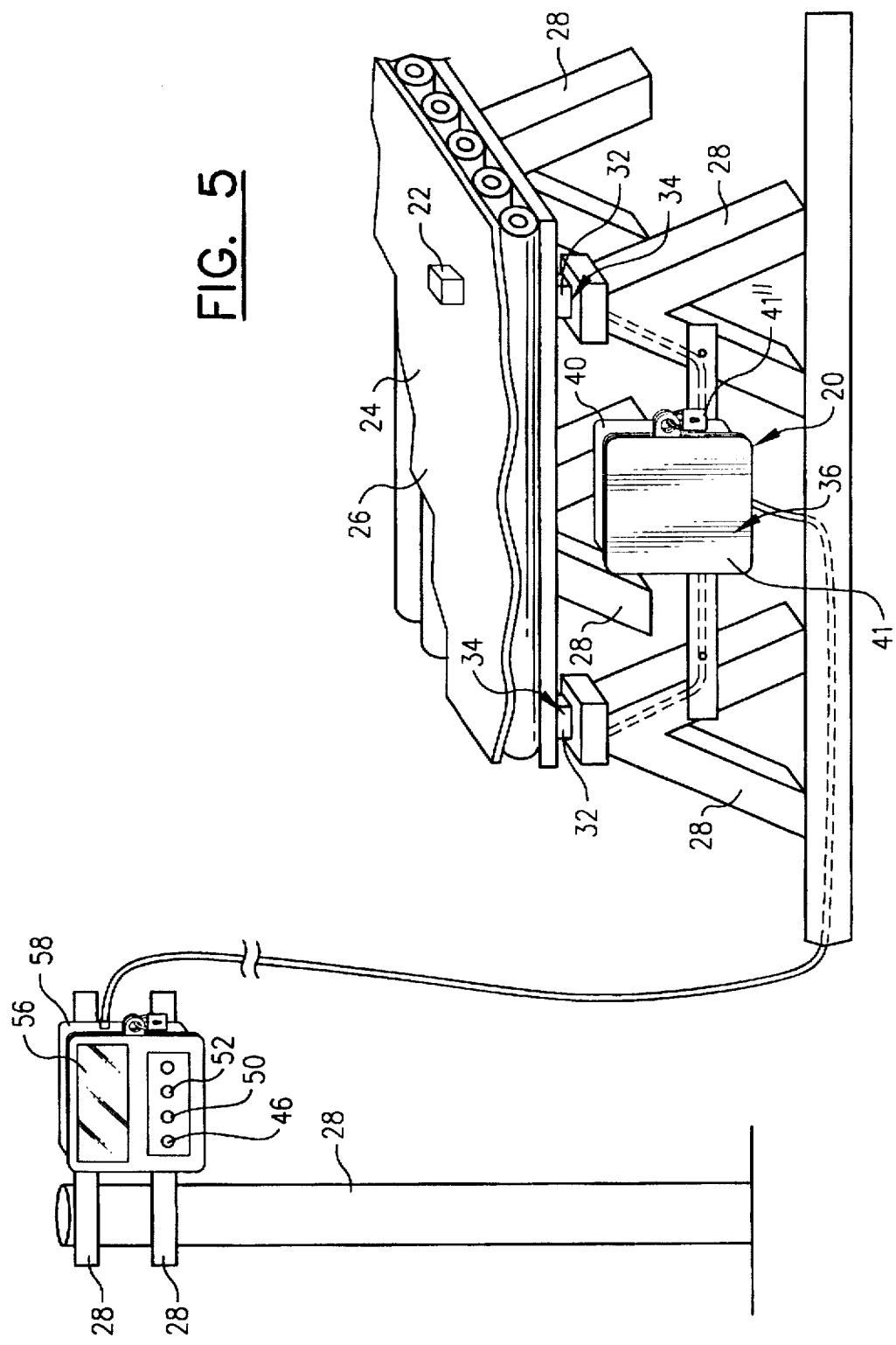
FIG. 5 is a partial, schematic, perspective view of a second embodiment of the present invention made in accordance with the teachings of this disclosure. As illustrated, the present invention is attached to means for transporting or delivering the object to a remote location. For example, the transporting or delivering means may comprise a conventional or nonconventional conveyor belt mechanism, system or assembly, or a transfer chute assembly. More particularly, the invention can be secured to an exoskeletal frame of a conveyor belt mechanism, system or assembly which is capable of containing and transporting the object. A monitor which displays the corrected measured weight can be attached either to the exoskeletal frame or to another support structure.
Figure 6:
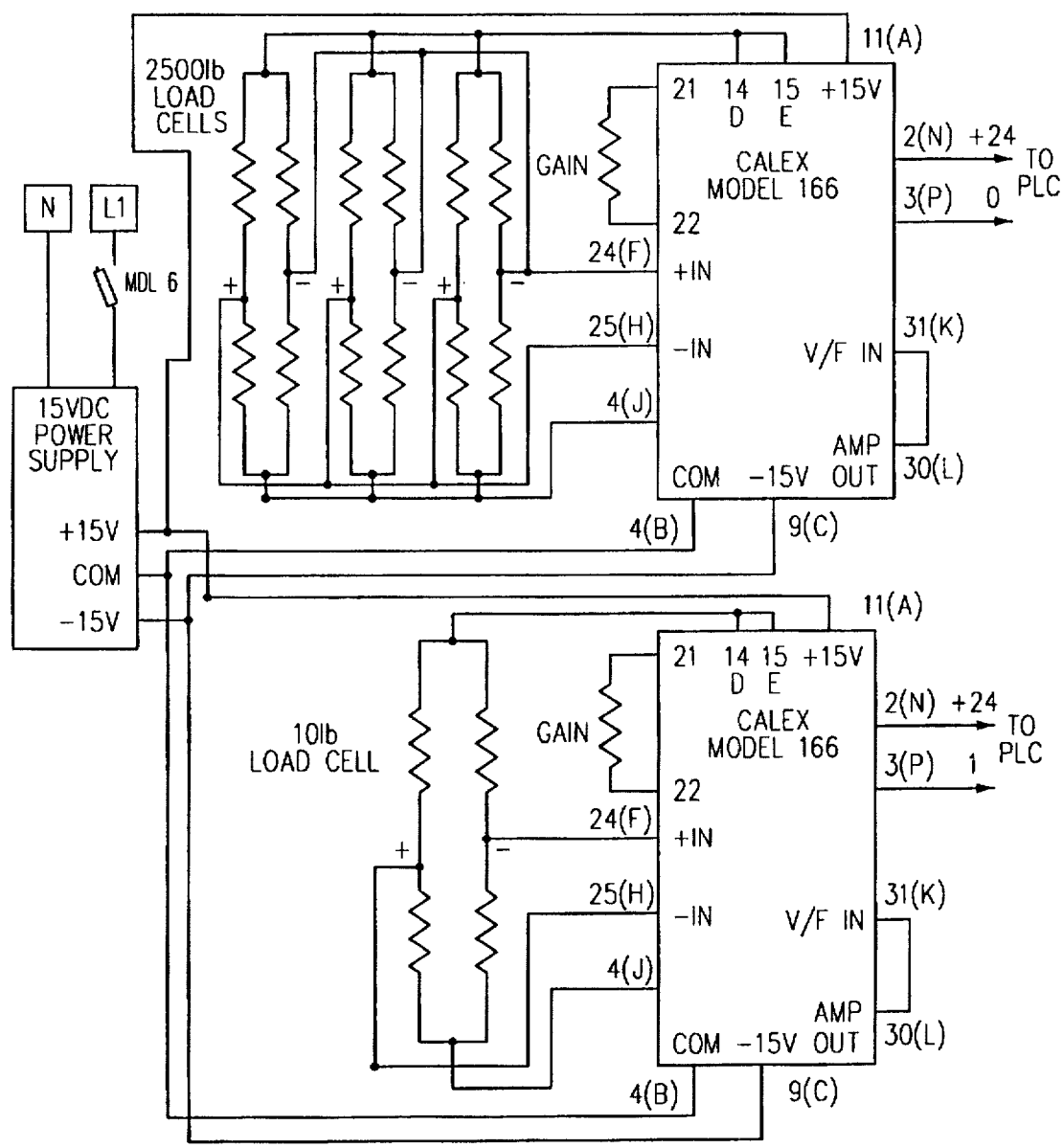
FIG. 6 is a schematic illustration of the preferred load cell wiring diagram.
Figure 7:
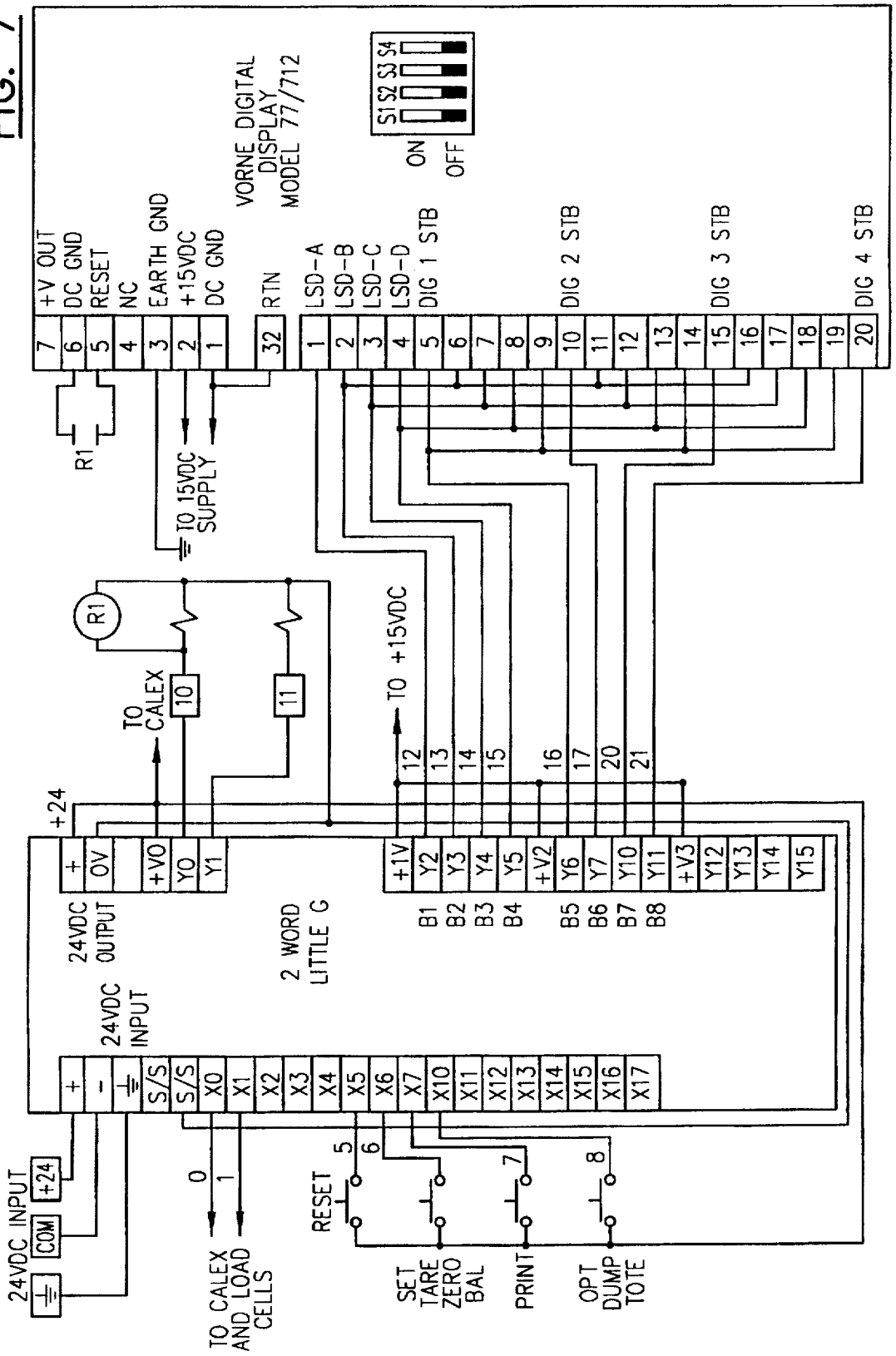
FIG. 7 is a schematic illustration of the preferred load cell wiring display diagram.

Alternatively, as illustrated within FIG. 5, the container 24 may comprise at least one conveyor belt 26.

In order to take a weight measurement of the object 22 placed within or upon the container 24, the container 24 must be at least partially isolated from a reference support structure 28. For example, within the current fishing industry, support structure 28 generally defines an exoskeletal frame that is placed around an internally positioned container 24, fish tote or box.

Figure 1:
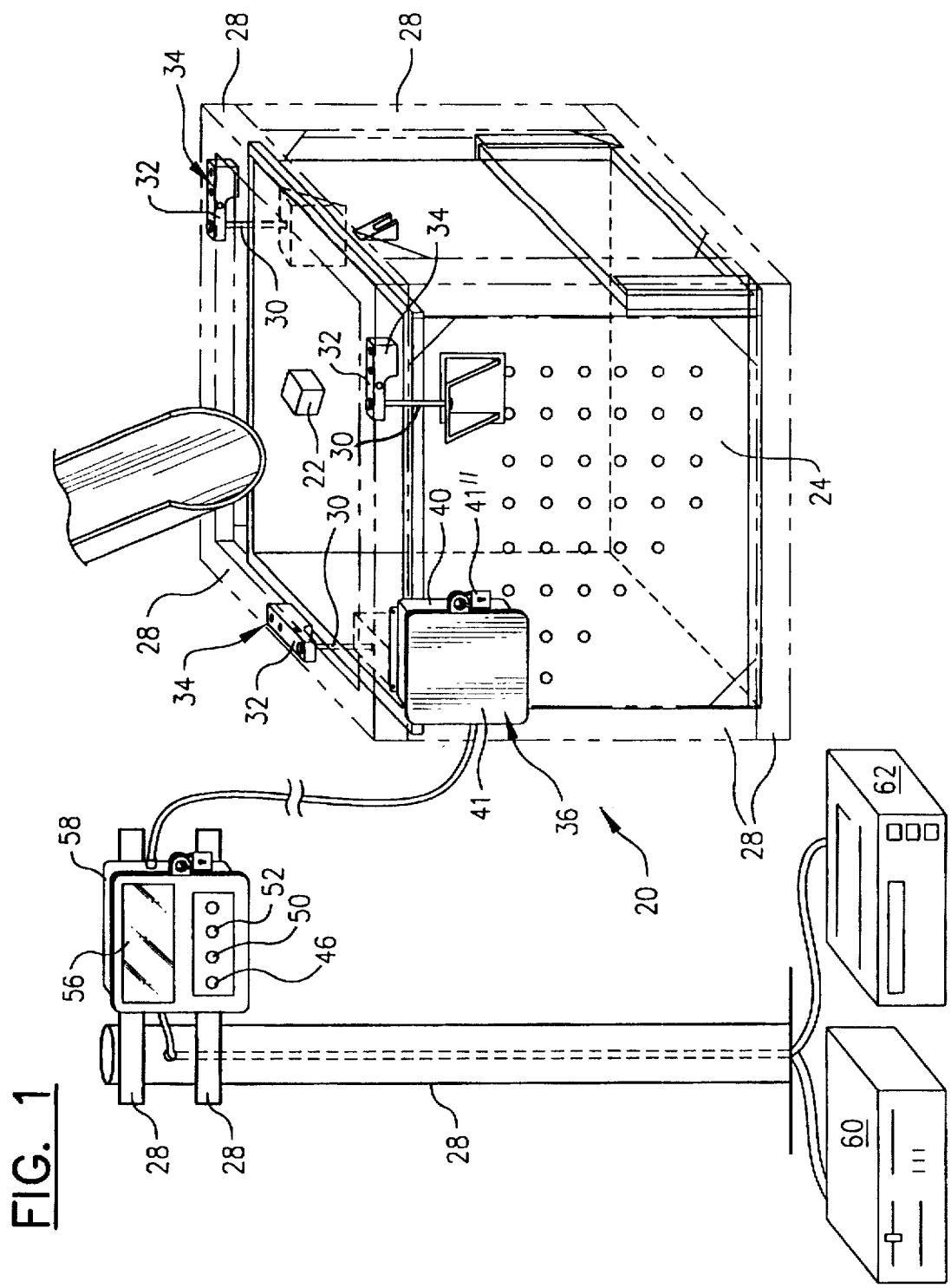
FIG. 1 is a schematic, perspective view of a first embodiment of the present invention made in accordance with the teachings of this disclosure. The present invention is attached to an exoskeletal frame of a tote or bin which is capable of containing an object, such as fish. A monitor which displays the corrected measured weight can be attached either to the exoskeletal frame or to another support structure.
Figure 2:
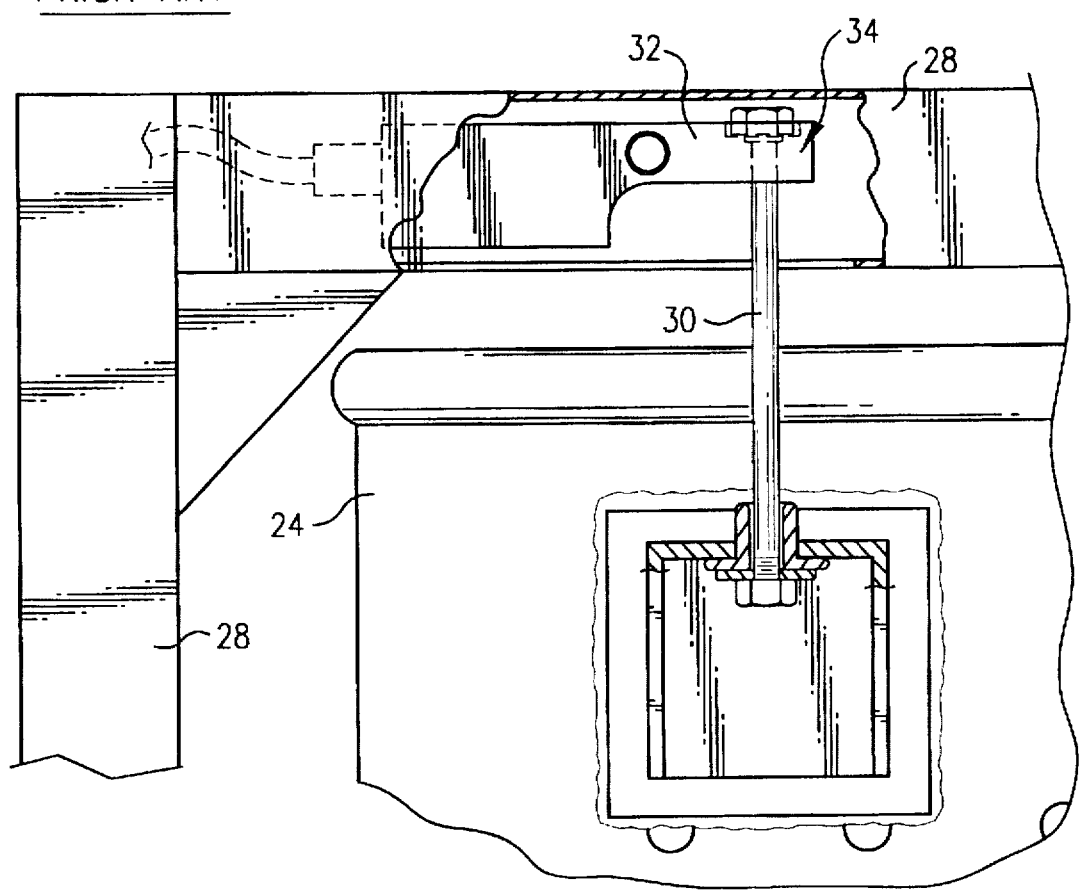
FIG. 2 is an enlarged, partial, cross-sectional, side-elevational view illustrating the attachment of the tote or bin to the exoskeletal frame and means for measuring the weight of the tote or bin.
Figure 3:
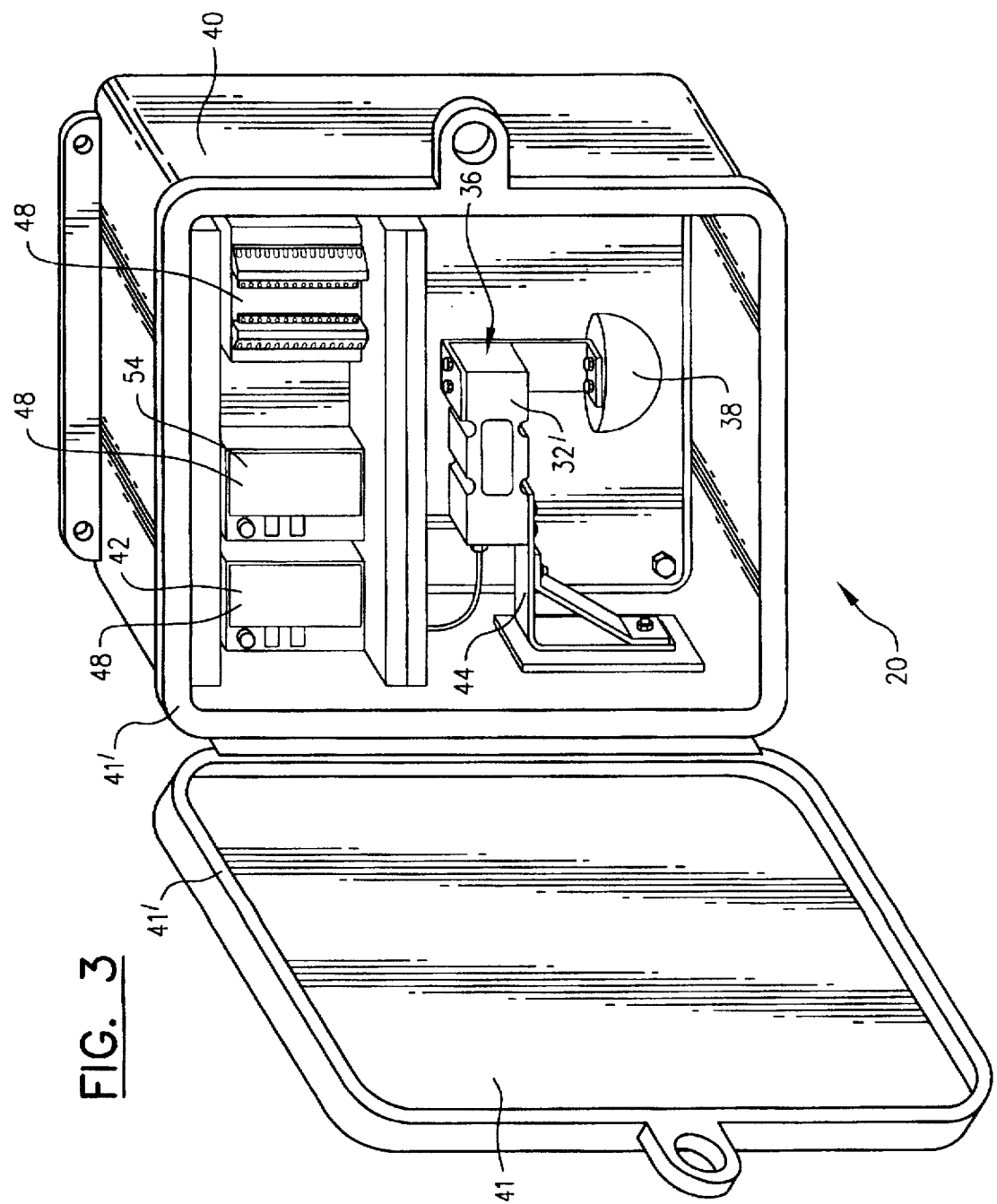
FIG. 3 is an enlarged, partial, perspective view of the present invention as illustrated in FIG. 1, further illustrating an isolated calibration weight and associated electronic equipment.
Figure 4:
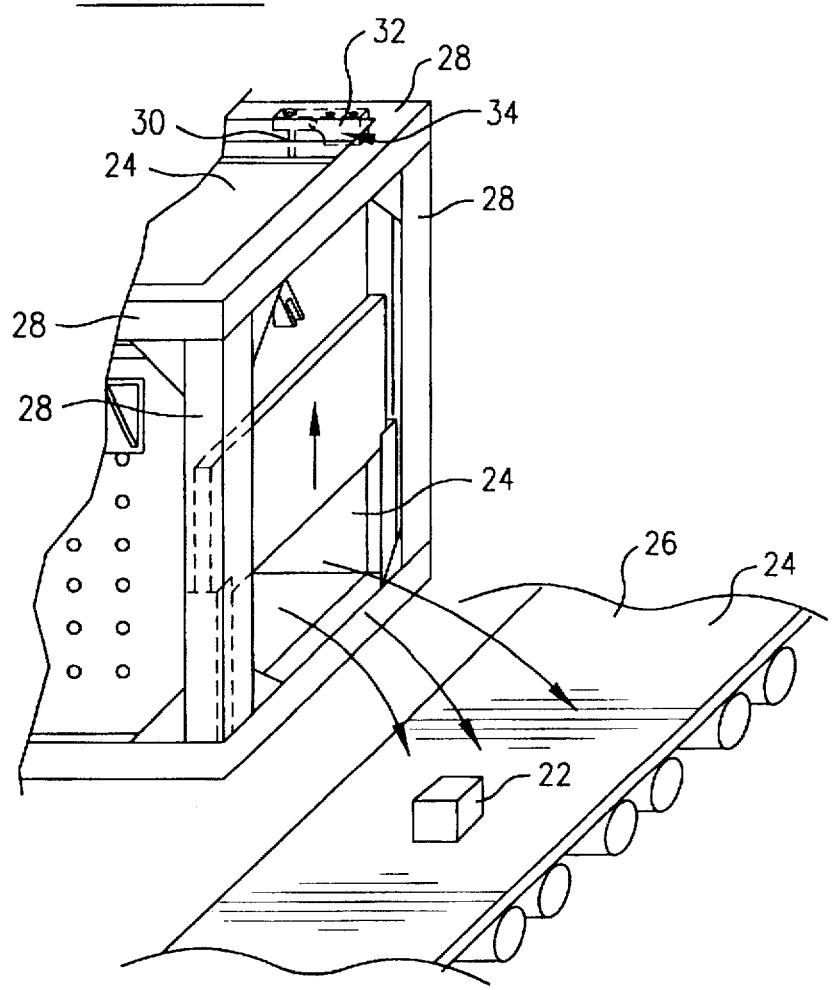
FIG. 4 is a partial, schematic, perspective view of the first embodiment of the present invention illustrating means for removing the contained and weighed object from the tote or bin. More particularly, the removing means generally comprises an exit port and a conveyor belt mechanism, system or assembly.

The container 24 is suspended from the support structure 28 by at least one cable 30. As shown in FIG. 1, within the preferred embodiment of the invention, the container 24 is suspended from the support structure 28 by three (3) or more spaced-apart, independently-acting cables 30. Thus positioned, the container 24 is at least partially isolated from the support structure 28 which defines an outer frame.

A grommet is preferably placed at or near the attachment point between the cable 30 and the container 24 and/or support structure 28. The grommet is intended to prevent chaffing of the cable 30 when the container 24 moves relative to the support structure 28.

If the support structure 28 was placed upon a deck of a boat or other moving structure or vehicle, the container 24 would similarly be at least partially isolated from the deck to which the support structure 28 is secured.

Such suspension or partial isolation also enables the container 24 to move relatively freely within a restricted distance and nearly eliminates inaccuracies that would otherwise be attendant to frictional contact between the support structure 28 and the container 24.

Each cable 30 is operatively secured to the support structure 28 and to the container 24 and is positioned therebetween. More particularly, each cable 30 is secured to an associated load cell 32 that is fixedly secured to either the support structure 28 or to the container 24. Each load cell 32 is capable of measuring weight. The combination of the load cells 32 and the cables 30 defines a first weighing means 34.

The combined weight of the container 24, as gathered by the three (3) load cells 32, determines the total weight of the system. For example, the weight of the empty container 24 can be initially determined.

Thereafter, the object 22 is placed within the container 24 and a second reading of the three load cells 32 is taken. The sum of the measured weights includes the weight of the container 24 and the contained object 22. Consequently, the weight of the container 24 can be subtracted from the total weight of the container 24 and object 22 to provide a specific measured weight value for the object 22.

A problem arises, however, when the support structure 28, the container 24 and/or the object 22 experience or are subjected to dynamic movement. Under such conditions, it is very difficult to obtain an accurate reading or weight measurement.

Heretofore, attempts to overcome this inherent inaccuracy that is attributable to dynamic movement generally comprised taking numerous weight measurements or readings, summing the total, and determining an average or mean weight value. Such averaging of weights, however, is still inaccurate.

The basic concept of the present invention is to provide a second weighing means 36 to weigh a reference mass 38, object or element that has a predetermined known weight. The reference mass 38 is operatively secured to the second weighing means 36, which in turn is secured to the support structure 28.

This second weighing means 36 and mass 38 are used as a comparative or calibrating reference weighing system to determine how the dynamic movement of the second weighing means 36 and/or reference mass 38 is affected by the dynamic movement of the support structure 28 and/or reference mass 38.

A comparison can thus be made between the known weight value and the dynamic or measured weight value of the reference mass 38. The resulting correction factor or ratio can then be applied to the dynamic or measured weight value of the object 22 contained within the container 24 to correct for the influences of the dynamic movement of the apparatus 20 and/or object 22.

Within the preferred embodiment of the invention, the reference or second weighing means 36 has a housing 40 that is fixedly secured to the support structure 28 or exoskeletal frame of the partially isolated container 24. The housing 40 generally defines an enclosure therein that can be shielded from the adverse effects of inclement weather.

The inventor prefers to use a stainless steel box as the housing 40. The housing 40 has a hinged door 41 thereon that permits relative easy access to the enclosure therein. A gasket 41' should be placed around the perimeter of the door opening to provide a water tight seal when the door is closed.

Means for locking the door 41 and, thereby, securing the enclosure against tampering may also be provided. For example, the door 41 may be provided with a lock 41".

If desired, an operable heater 42 may be placed within the enclosure of the housing to further protect the second weighing means 36 from being adversely affected by condensation and/or icing as commonly experienced within the climates the present invention is intended to operate. The heater 42 effectively stabilizes the electrical equipment protected within the enclosure.

A mounting bracket 44 is fixedly secured to the housing 40 within the enclosure. A relatively sensitive reference load cell 32' is fixedly secured to the mounting bracket 44 within the enclosure. The reference mass 38, such as a lead ball, having a known weight is then operatively secured to the reference load cell 32'.

Electronic readings, which indicate the measured weight of the reference mass 38, are received from the reference load cell 32 during dynamic movement of the support structure 28 and the housing 40.

Concurrent, instantaneous and/or simultaneous electronic readings, which indicate the measured weight of the object 22 held within the container 24, are also received and combined from the plurality of load cells 32 positioned between the container 24 and the support structure 28.

A comparison is made between the known weight value and the measured weight value of the reference mass 38. The resulting ratio or correction factor is applied to the combined measured weight of the object 22 contained within the container 24. In essence, the correction factor or ratio corrects the combined measured weight of the object 22 contained within the container 24 to correct for the adverse influences of the dynamic movement of the apparatus 20.

Within the preferred embodiment of the present invention, the apparatus 20 further comprises a power activation and deactivation switch 46 which can be used to activate electronic equipment 48 stored within the enclosure of the housing 40.

A measurement activation switch 50 may be used to recalculate and/or recalibrate the measured weight value of the container 24. This feature is particularly important if the container 24 is subjected to frequent icing and/or accumulation of debris which will alter its total overall weight value. In other words, the apparatus 20 may be recalibrated each time it is emptied to assure a more accurate reading of the next load of object 22.

The measurement activation switch 50 may also be used to calculate a measured weight value of the combined container 24 and the object 22 contained therein.

Concurrently, instantaneously and/or simultaneously, a second measurement activation switch 52 is activated to calculate a measured dynamic weight value for the reference mass 38.

Operatively connected to the reference load cell 32' positioned within the enclosure of housing 40 is one or more EPROM microprocessors 54. The EPROM microprocessors 54 have a computer program or algorithm therein which can be activated and operated to compute the respective correction factors or ratios and then calculate the corrected weight values of the object 22 held within the container 24.

Once the corrected weight values are obtained for the object 22, such weight values are preferably displayed upon a large LED readout display for all observers to see. The inventor prefers to use six (6) large digit displays 56 that are manufactured by EF Lofquist and sold as part number MOD-8810. Other large digit displays 56 may include those manufactured by Vorne Industries and sold as part number 77/712-O-H-6X or those manufactured by Branom Red L and sold as part number LDD00600.

The large digit displays 56 are housed within a large digit display case 58 or enclosure such as one manufactured by Branom Red L and sold as part number ENC7000.

Other electrical components include: (a) an input extension block manufactured by Mitsubishi and sold as part number FX-16EEYTESS; (b) a personality module for the large digit display which is manufactured by Branom Red L and sold as part number PBLSP600; (c) a serial cm; (d) a MV/V SIG conditioner manufactured by Brnom Apl and sold as part number API4051G; and (e) a primary fuse manufactured by Bussman and sold as part number MDL10. Of course, other electrical component parts may also be used and the above-listed items can be exchanged and/or upgraded as the circumstances require or as desired.

In essence, the electrical equipment translates voltage changes to frequency counters, which are scaled. The signal is then sent via a digital impulse to an output device such as to a monitor, printer, or LED display.

In summary, use of this apparatus 20 is extremely simple. After installation, the power activation and deactivation switch 46 is turned on. The measurement activation switch 50 is activated to recalibrate the apparatus 20 for the current weight of the empty container 24. The object 22 is placed into or upon the container 24. The measurement activation switch 50 is again activated to calculate the measured weight of the combined container 24 and the object 22 contained therein.

Figure 8A:
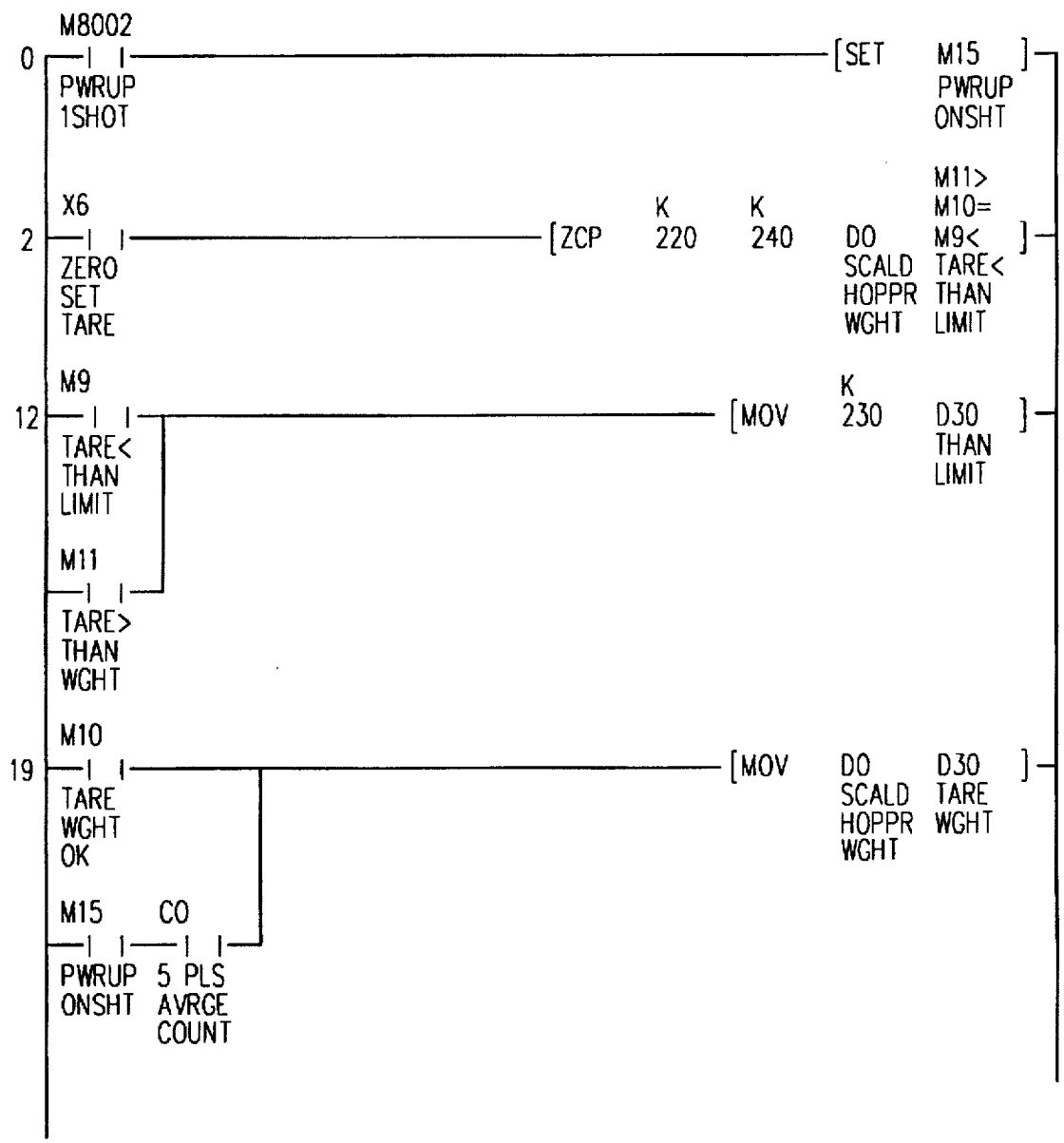
FIGS. 8A through 8J illustrate the preferred preprogrammed EPROM computer program used within the present invention.
Figure 8B:
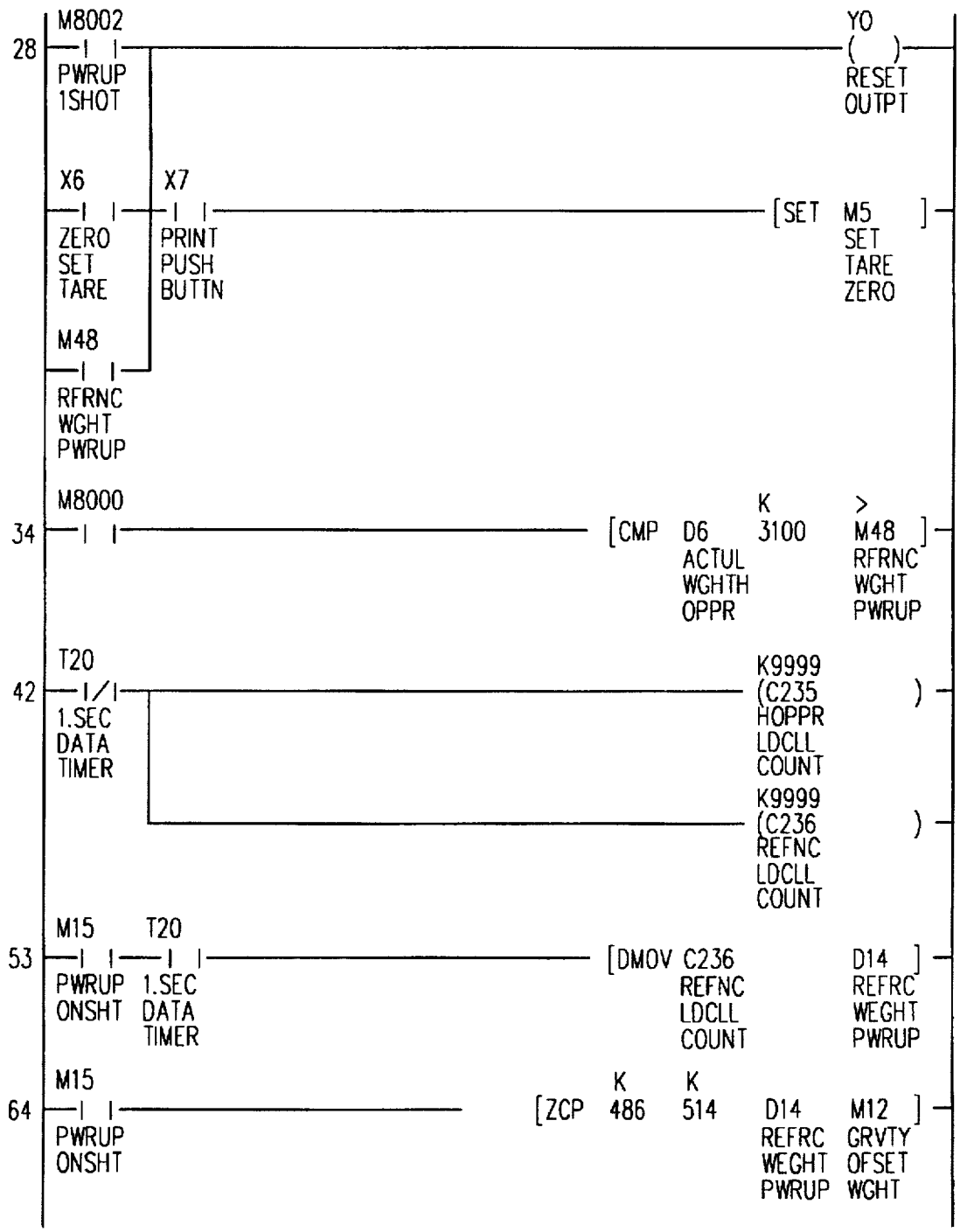
Figure 8C:
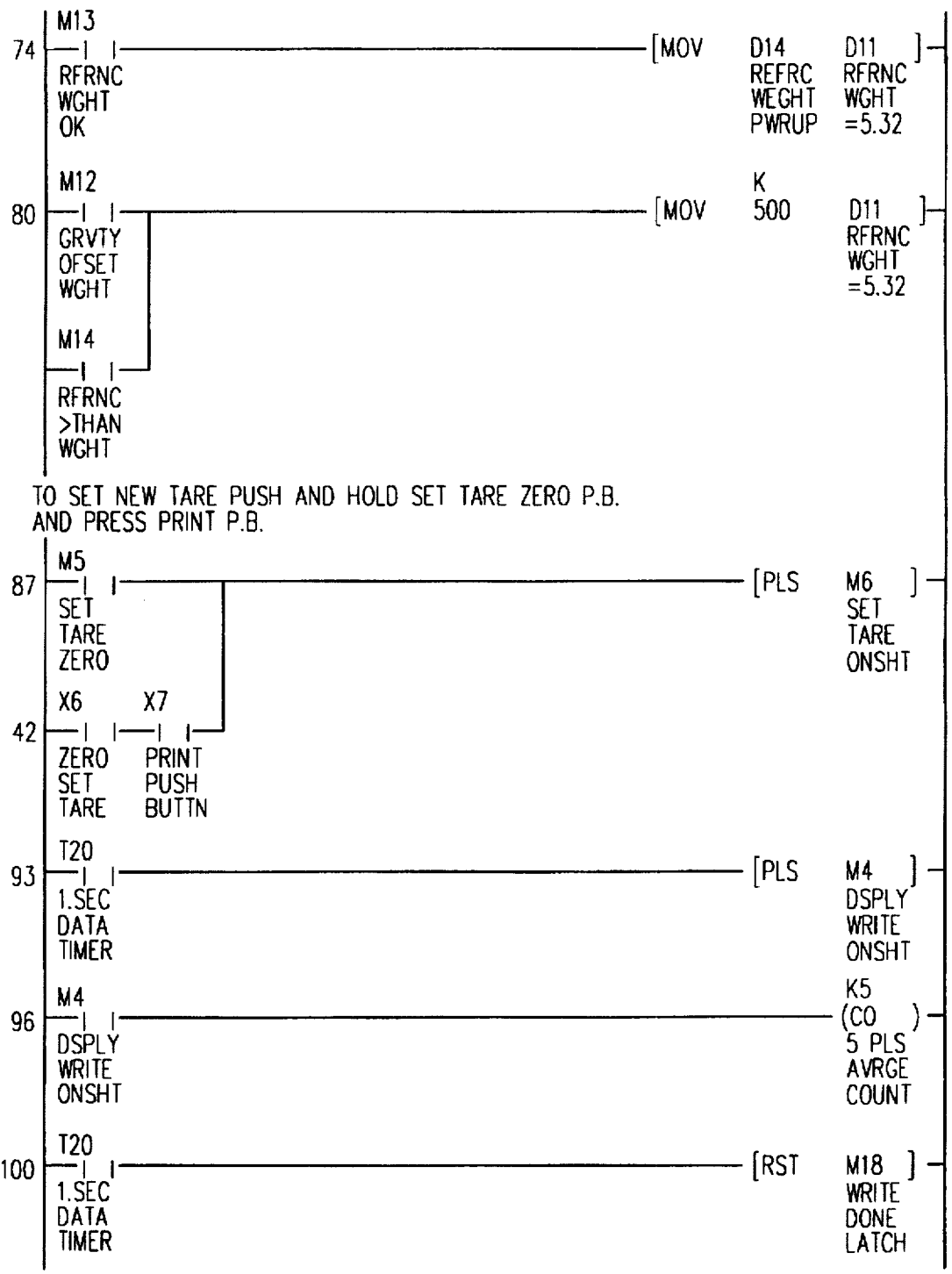
Figure 8D:
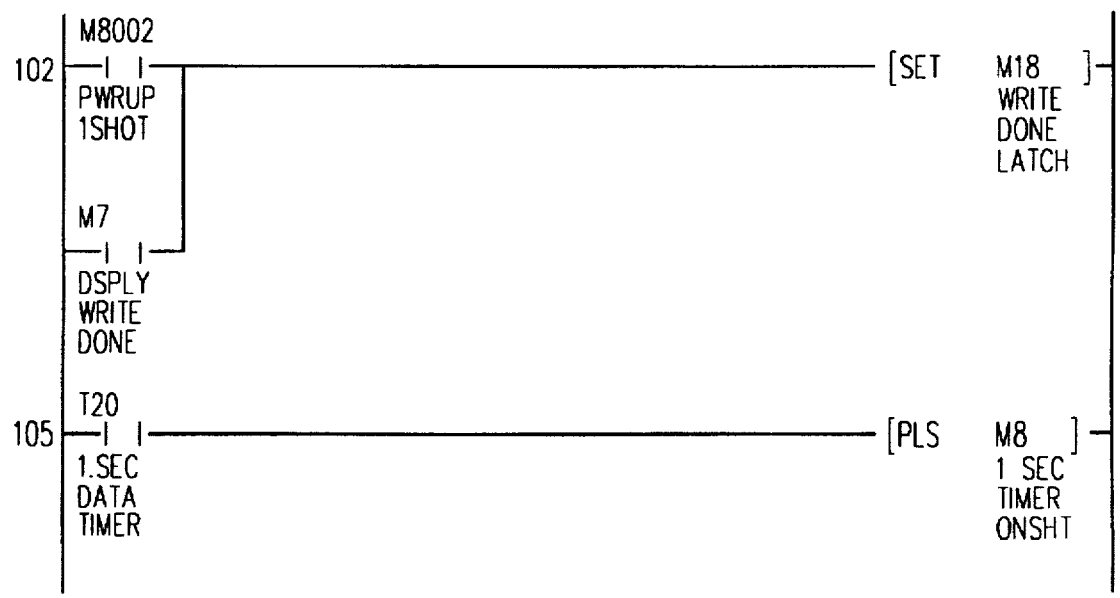
Figure 8E:
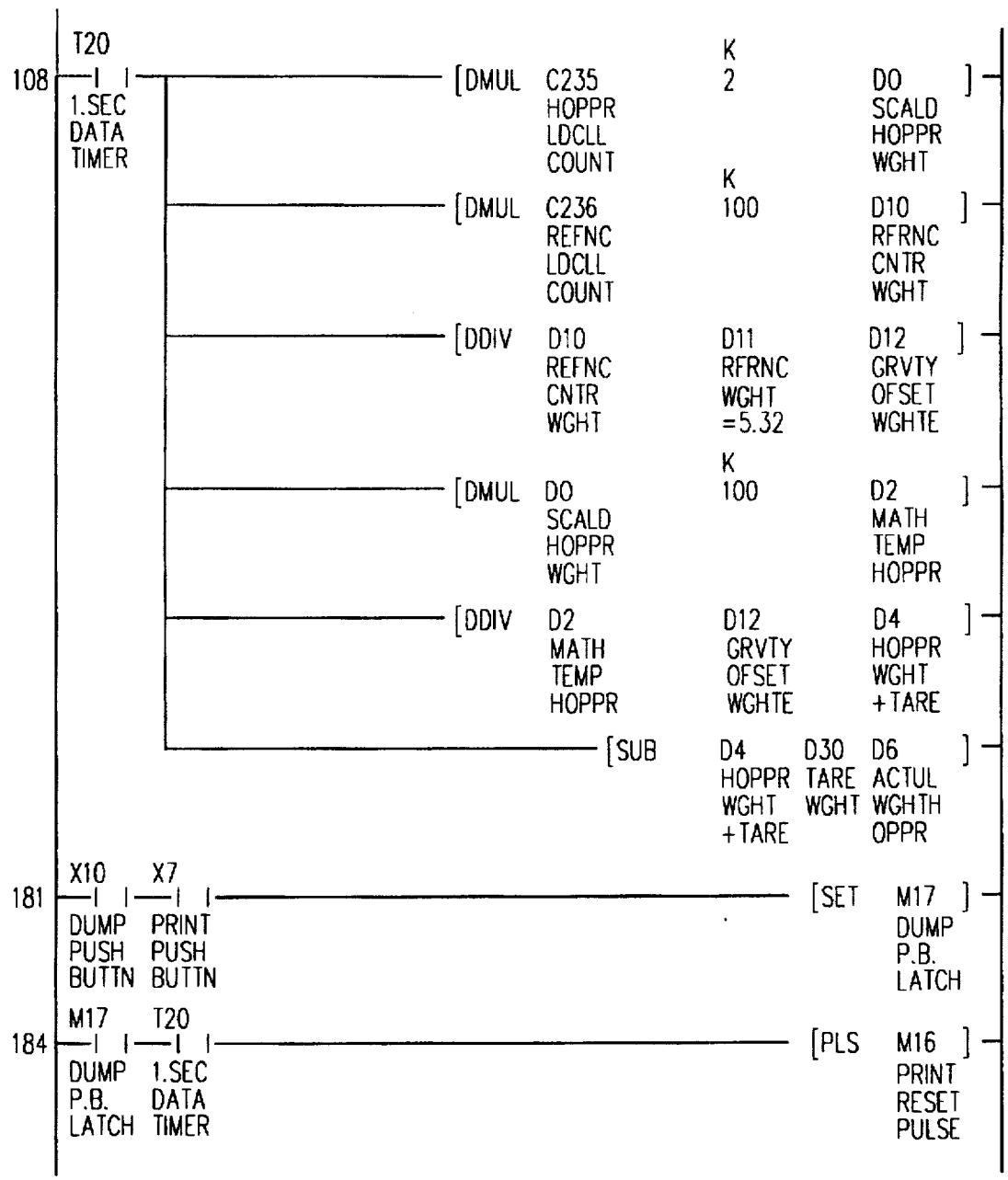
Figure 8F:
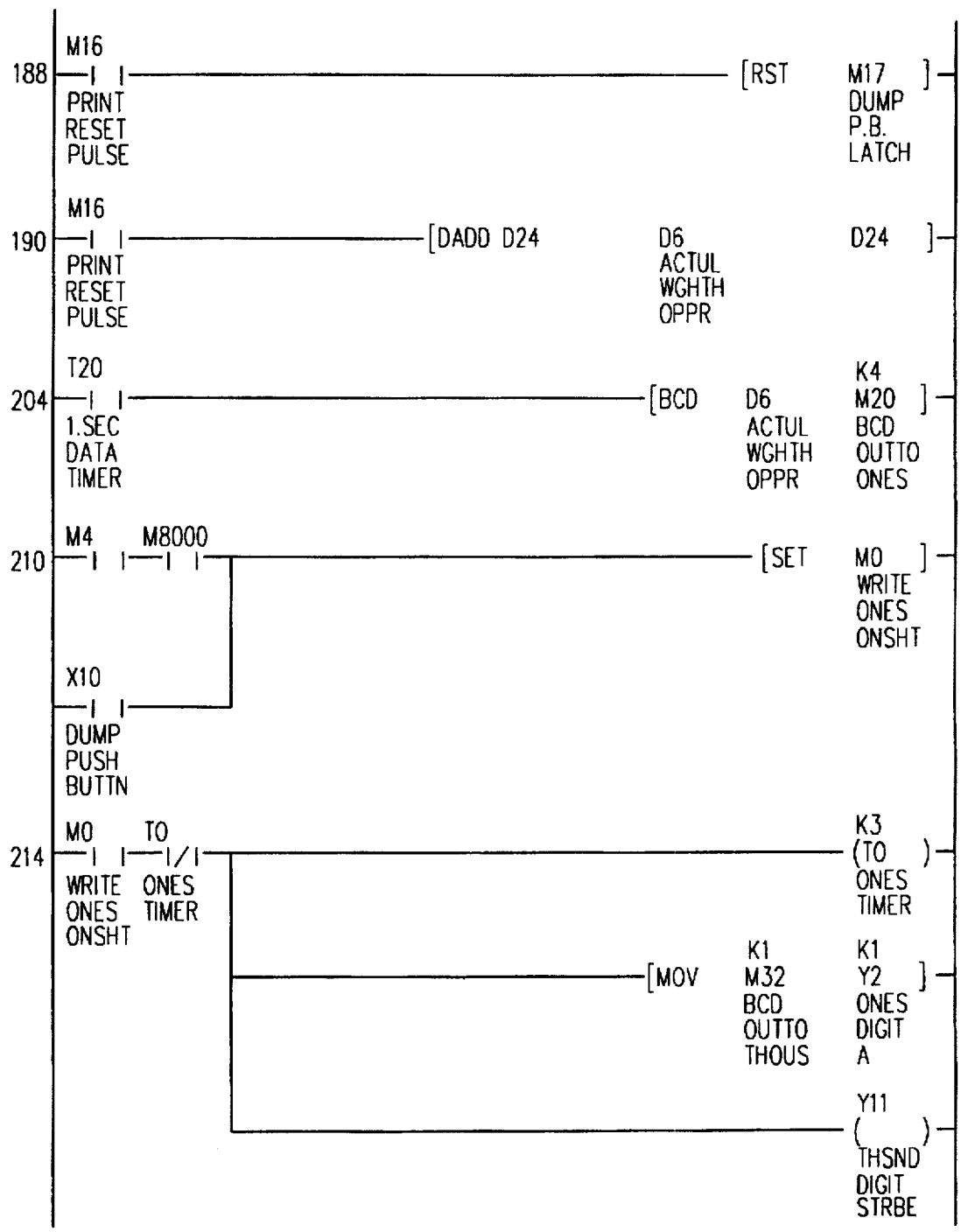
Figure 8G:
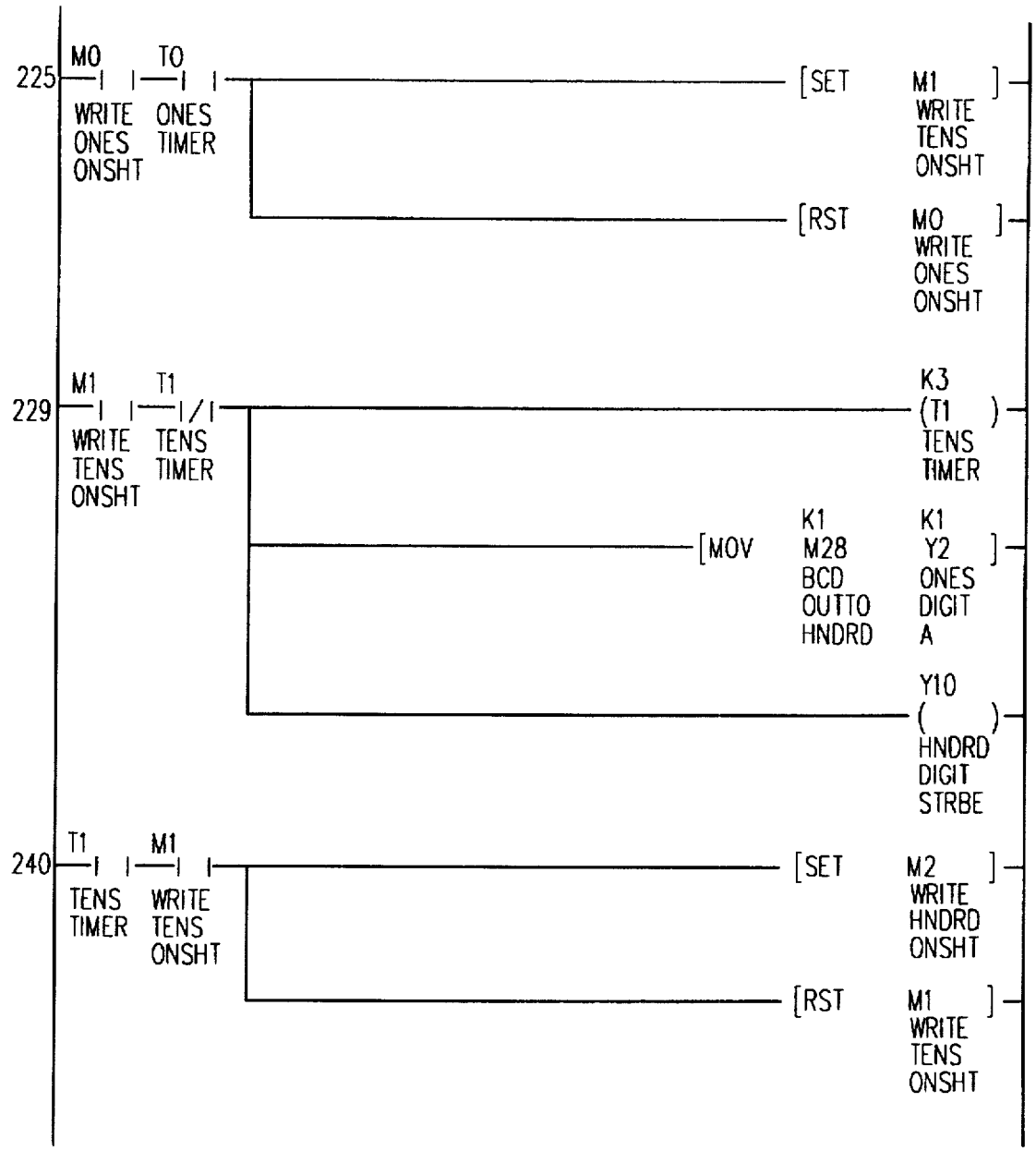
Figure 8H:
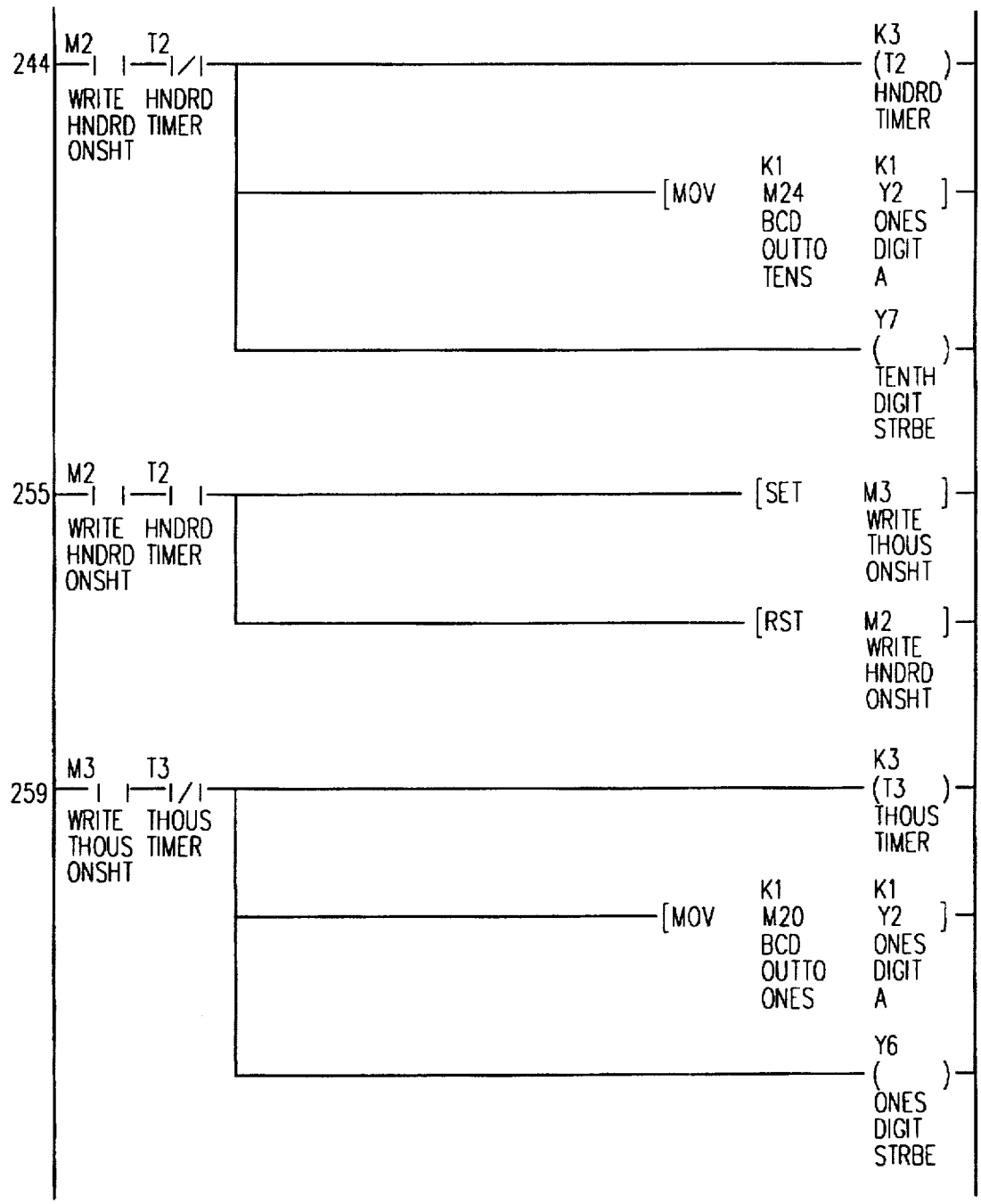
Figure 8:
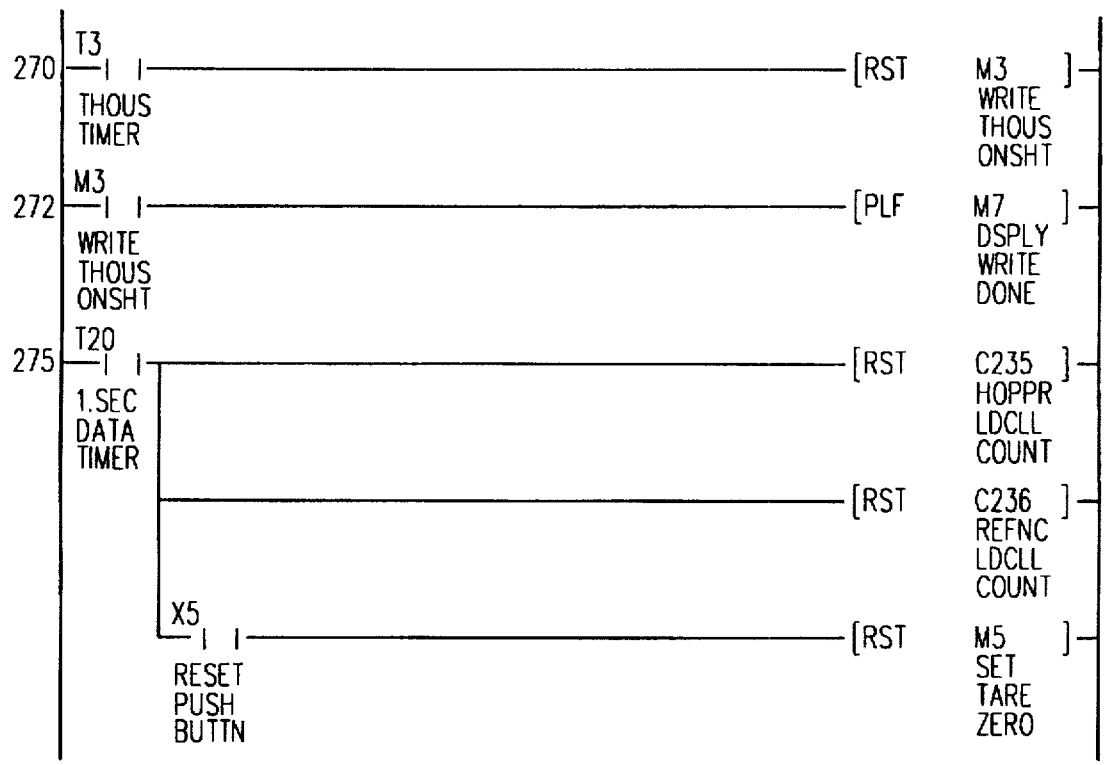
Figure 8J:
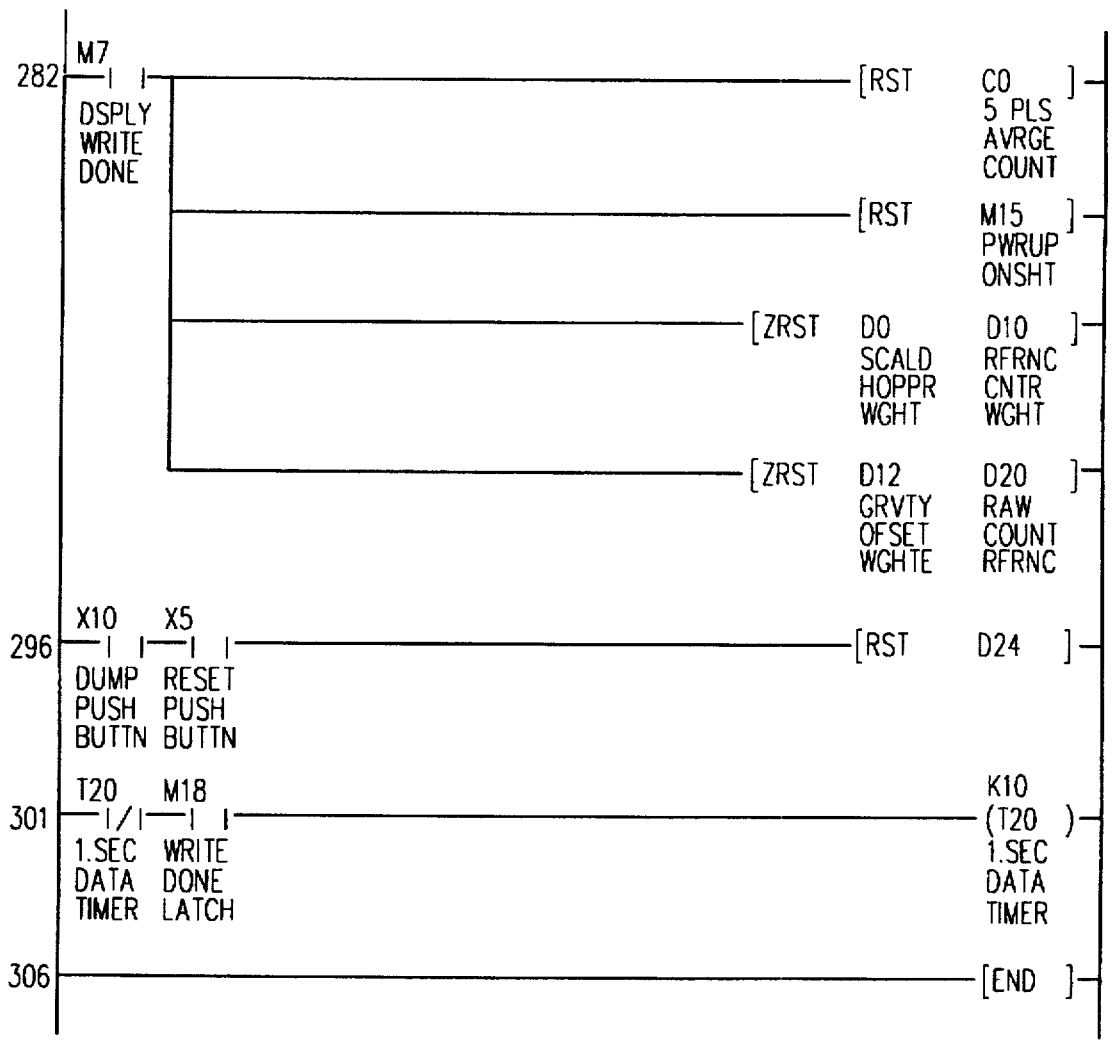

Concurrently, instantaneously and/or simultaneously the second measurement activation switch 52 is activated to calculate the measured weight of the reference mass 38. The EPROM microprocessor 54 processes the computer program or algorithm identified in FIG. 8 to compute or calculate the measured weight of the reference mass 38. The EPROM microprocessor 54 compares the measured weight to the known weight of the reference mass 38 to obtain a correction factor or ratio. The measured weight of the container 24 is subtracted from the combined measured weight of the container 24 and the object 22. The measured weight of the object 22 is then modified or adjusted by the correction factor or ratio as set forth within the program identified in FIG. 8. The modified or corrected weight value of the object 22 is then displayed upon the large LED digit readout display 56 for all to see.

The computer program or algorithm may also take into consideration other factors, such as the potential effects that ambient temperature and/or barometric pressure might have on the load cells 32 and measured weight values.

If desired, the amount of such modified or actual weight value can be transmitted to a data storage device 60 and/or to a printer 62 for recordation of the transaction. In other words, the corrected weight values can be fed to a data storage device 60 for recordation and later summation.

The recalculation or recalibration of the measured weight value of the container 24 permits the apparatus 20 to continue to be used irrespective of the amount of debris and/or ice that might accumulate upon or within the container 24.

Periodic inspection of the apparatus 20 by government officials and sealing of the housing 40 with a governmentally controlled lock 41" will assure both the purchaser and the seller that the apparatus 20 is operating correctly and tampering has not occurred.

The apparatus 20 of the present invention may be factory installed or retrofit almost any type of preexisting commercial weight system. As mentioned above, the primary intended application for this apparatus 20 is the commercial fishing industry.

The present invention allows the weight of the contained object 22 to be precisely determined without requiring the apparatus 20 to be placed in a static position on a dock or upon land.

The present invention allows easy visibility of the numerical amount of the corrected weight value of the contained object 22.

The present invention generally has no moving parts to break down or require repair or replacement.

The present invention is compact, unobtrusive and is easily operated.

The present invention is simple, efficient, attractive and aesthetically pleasing, and will not occupy a significant amount of space when installed and operated.

The present invention may be used with existing weight systems without requiring major modification thereof.

Operation of the present invention is relatively self-explanatory and does not require extensive instructions for use.

The means and construction disclosed herein are by way of example and comprise primarily the preferred and alternative forms of putting the invention into effect. Although the drawings depict preferred and alternative embodiments of the invention, other embodiments are described within the preceding and following text. One skilled in the art will appreciate that the disclosed apparatus and devices may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its various forms, including all alternatives, modifications, equivalents, and alternative embodiments that fall within the legitimate and valid scope of the claims, appropriately interpreted under the Doctrine Of Equivalents.

INDUSTRIAL APPLICABILITY

The present invention is applicable to any industry, occupation or sport that could benefit from using simple, reliable, easily used apparatus and processes for measuring a correct weight of one or more objects that are subjected to predictable and/or unpredictable static and/or dynamic conditions. Notwithstanding the preceding sentence, the invention is primarily intended to be used within fishing and marine industries. Other applications for the apparatus and processes of this invention, however, could be easily found. For example, the present invention could be used to measure the correct weight of shipped packages, mail, manufactured objects, measured portions of substances, and the like.

The apparatus of this invention is compact, unobtrusive, efficient, durable, rugged, is easily constructed, and is inexpensive and economical to manufacture.

Traditional and/or nontraditional manufacturing apparatus and procedures may be used to manufacture the present invention without necessarily requiring significant alteration thereto to accomplish the purposes taught herein.

Once manufactured, the apparatus of the present invention can be easily stored, transported and installed using a minimum amount of space. The invention minimizes the packaging size and cargo space required to contain and ship the apparatus, thereby, reducing transportation and storage costs. Furthermore, when installed within a boat, ship, vessel, truck, train, conveyor belt mechanism and/or other means of conveyance, the invention occupies a minimal amount of space and, therefore, is relatively unobtrusive. In other words, the invention performs its intended function in a superior manner without obstructing performance of adjacent or surrounding operations.

The present invention has a special benefit of being applicable to a wide variety of different weight measuring needs. This benefit significantly broadens the scope and versatility of the claimed apparatus and processes.

I claim:

1. An apparatus for measuring a weight of at least one object subjected to predictable or unpredictable static or dynamic motion, said apparatus comprising a combination of:
   (a) a support structure;
   (b) a mass having a known weight value, said mass being operatively connected to, secured to or formed integrally within said support structure, said mass being generally shielded from losing or gaining additional mass thereto;
   (c) first weighing means for obtaining a measured weight value of said mass relative to said support structure;
   (d) means for comparing said measured weight value of said mass to said known weight value of said mass to obtain a correction factor attributable to dynamic motion of said mass relative to said support structure;
   (e) a container for selectively holding or transporting the object, said container being operatively connected to, secured to or formed integrally within said support structure;
   (f) second weighing means for obtaining
      (i) an empty weight value of said container relative to said support structure when the object is not held therein or transported thereupon and
      (ii) a combined weight value of said container and the object held therein or transported thereupon relative to said support structure;
   (g) means for subtracting said empty weight value of said container from said combined weight value of said container and the object held therein or transported thereupon to obtain a measured weight value of the object; and
   (h) means for using said correction factor to modify said measured weight value of the object to account for dynamic motion of said container and the object held therein or transported thereupon relative to said support structure.

2. The apparatus of claim 1, wherein said support structure generally comprises a support, frame or assembly.

3. The apparatus of claim 2, wherein said support, frame or assembly is operatively connected to, secured to or formed integrally within a boat, ship, vessel, truck, train, vehicle, conveyor mechanism or means of conveyance.

4. The apparatus of claim 1, wherein said mass having said known weight value generally comprises an element of metal or lead operatively secured to said support structure.

5. The apparatus of claim 1, wherein said mass is generally shielded from losing or gaining additional mass by being protected by a housing, said housing defining an enclosure within which said mass is located.

6. The apparatus of claim 1, wherein said first weighing means generally comprises a load cell that is operatively connected between said support structure and said mass.

7. The apparatus of claim 1, wherein said means for comparing said measured weight value of said mass to said known weight value of said mass to obtain a correction factor attributable to dynamic motion of said mass relative to said support structure generally comprises a computer and a computer program.

8. The apparatus of claim 1, wherein said container generally comprises a tote or bin.

9. The apparatus of claim 8, wherein said support structure generally comprises an exoskeletal frame for said tote or bin.

10. The apparatus of claim 1, wherein said container generally comprises a conveyor belt.

11. The apparatus of claim 1, wherein said container generally comprises a cable, rod or brace.

12. The apparatus of claim 1, wherein said second weighing means generally comprises at least one load cell that is operatively connected between said support structure and said container.

13. The apparatus of claim 1, wherein said means for subtracting said empty weight value of said container from said combined weight value of said container and the object held therein or transported thereupon to obtain a measured weight value of the object generally comprises a computer and computer program.

14. The apparatus of claim 1, wherein said means for using said correction factor to modify said measured weight value of the object to account for dynamic motion of said container and the object held therein or transported thereupon relative to said support structure generally comprises a computer and computer program.

15. An apparatus for measuring a weight of at least one object selectively held or transported within a container, the container being operatively connected to, secured to or formed integrally within a support structure, said apparatus comprising a combination of:

(a) a mass having a known weight value, said mass being operatively attached to, connected to, secured to or formed integrally within the support structure;

(b) first weighing means for obtaining a measured weight value of said mass relative to the support structure;

(c) means for comparing said measured weight value of said mass to said known weight value of said mass to obtain a correction factor attributable to dynamic motion of said mass relative to the support structures;

(d) second weighing means for obtaining a measured weight value of the object, said measured weight value of the object being obtained generally simultaneously with said measured weight value of said mass; and (e) means for applying said correction factor to said measured weight of the object.

16. The apparatus of claim 15, wherein said mass is generally shielded from losing or gaining additional mass thereto.

17. An apparatus for measuring a weight of at least one object selectively held or transported within a container, the container being operatively connected to, secured to or formed integrally within a support structure, said apparatus comprising a combination of:

(a) a mass having a known weight value, said mass being operatively attached to, connected to, secured to or formed integrally within the support structure;

(b) first weighing means for obtaining a measured weight value of said mass relative to the support structure;

(c) means for comparing said measured weight value of said mass to said known weight value of said mass to obtain a correction factor attributable to dynamic motion of said mass relative to the support structure, said mass being generally shielded from losing or gaining additional mass thereto, and (d) second weighing means for obtaining:
   (i) an empty weight value of the container relative to the support structure when the object is not held therein or transported thereupon, and
   (ii) a combined weight value of the container and the object held therein or transported thereupon relative to the support structure.

18. The apparatus of claim 17, further comprising means for subtracting said empty weight value of the container from said combined weight value of the container and the object held therein or transported thereupon to obtain a measured weight value of the object.

19. The apparatus of claim 18, further comprising means for using said correction factor to modify the measured weight value of the object to account for dynamic motion of the container and the object held therein or transported thereupon relative to the support structure.

20. A method for measuring a weight of at least one object subjected to predictable or unpredictable static or dynamic motion, said method comprising steps of:

(a) obtaining an empty weight value of a container relative to a support structure when the object is not selectively held within the container or transported upon the container, the container being operatively connected to, secured to or formed integrally within the support structure;

(b) placing the object within or upon the container;

(c) obtaining a combined weight value of the container and the object relative to the support structure;

(d) subtracting the empty weight value of the container from the combined weight value of the container and the object to obtain a measured weight value of the object;

(e) obtaining a measured weight value of a mass having a known weight value relative to the support structure, the mass being operatively connected to, secured to or formed integrally within the support structure, the mass being generally shielded from losing or gaining additional mass thereto;

(f) comparing the measured weight value of the mass to the known weight value of the mass to obtain a correction factor attributable to dynamic motion of the mass relative to the support structure; and (g) using the correction factor to modify the measured weight value of the object to account for dynamic motion of the container and the object held therein or transported thereupon relative to the support structure.

* * * * *